United States Patent
Zhang et al.

(10) Patent No.: US 11,520,792 B2
(45) Date of Patent: Dec. 6, 2022

(54) DISTRIBUTED CARDINALITY OPTIMIZATION

(71) Applicant: Palo Alto Networks, Inc., Santa Clara, CA (US)

(72) Inventors: Fan Zhang, Sunnyvale, CA (US); Ran Xia, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 16/915,925

(22) Filed: Jun. 29, 2020

(65) Prior Publication Data

US 2020/0409957 A1    Dec. 31, 2020

Related U.S. Application Data

(60) Provisional application No. 62/868,913, filed on Jun. 29, 2019.

(51) Int. Cl.
*G06F 16/245* (2019.01)
*G06F 16/2455* (2019.01)

(52) U.S. Cl.
CPC .. *G06F 16/24561* (2019.01); *G06F 16/24554* (2019.01)

(58) Field of Classification Search
None
See application file for complete search history.

(56) References Cited

U.S. PATENT DOCUMENTS

| | | | |
|---|---|---|---|
| 9,047,246 B1* | 6/2015 | Rahut | G06F 16/903 |
| 11,055,405 B1* | 7/2021 | Jin | G06F 16/245 |
| 2007/0280233 A1* | 12/2007 | Bush | G06F 16/215 |
| 2008/0306903 A1* | 12/2008 | Larson | G06F 16/2462 |
| 2016/0019316 A1* | 1/2016 | Murphey | G06F 16/906 707/722 |
| 2016/0283551 A1* | 9/2016 | Fokoue-Nkoutche | G06F 16/24535 |
| 2018/0316727 A1* | 11/2018 | Tsironis | G06F 16/2358 |
| 2019/0268355 A1* | 8/2019 | Nisbet | G06F 16/245 |
| 2019/0272271 A1* | 9/2019 | Bhattacharjee | G06F 16/2455 |
| 2020/0042712 A1* | 2/2020 | Foo | G06F 16/9024 |

* cited by examiner

*Primary Examiner* — Son T Hoang
(74) *Attorney, Agent, or Firm* — Van Pelt, Yi & James LLP

(57) ABSTRACT

A query requesting a count of unique data values for a specific attribute is received. The received query is used to generate and transmit a plurality of non-overlapping queries to a data store. A plurality of responses is received from the data store. Results from the plurality of responses is summed and the resulting sum is returned.

15 Claims, 15 Drawing Sheets

```
{
  "evtType": "evt_connect",
  "iotDevid": "AA:BB:CC:01:02:03",
  "profileType": "unknown",
  "tenantid": "customerbeta1",
  "timestamp": 1591646393584,
  "evtContent": {
    "hostname": "IMAGING001",
    "hostname_src": "DHCP",
    "roles": "",
    "monitored": true,
    "ip": "10.14.176.208",
    "ip_src": "dhcp",
    "dhcp_option_55": "1,3,28,6,15,12"
  },
  "@timestamp": "2020-06-08T20:08:55.944Z",
  "routerid": "44454C4C4800103480046B2C04F4A5633",
  "profileId": "n/a",
  "profileCategory": "n/a",
  "profileVertical": "n/a"
}
```

FIG. 2D

```
{
  "sessionCount": "2",
  "evtType": "evt_session",
  "evtContent": {
    "sessions": [
      {
        "remoteURL": "10.226.138.12",
        "remoteIPAddr": "10.226.138.12",
        "remotePort": 9997,
        "ipProtocol": 6,
        "localIPAddr": "10.98.1.139",
        "localPort": 59970,
        "appName": "splunk",
        "txBytes": 59442,
        "rxBytes": 2383,
        "txPkts": 74,
        "rxPkts": 37,
        "tcpFlags": "SAPECF",
        "durationUsec": 30588831,
        "ts": "1591646859236",
        "profileType": "IoT",
        "profileConfidenceScore": 99,
        "profileId": "CT Scanner CT750HD",
        "profileVertical": "Medical",
        "profileCategory": "CT Scanner",
        "geoLocation": "internal"
      },
      {
        "remoteURL": "www.google.com",
        "remoteIAddr": "216.58.194.164",
        "remotePort": 443,
        "ipProtocol": 6,
        "localIPAddr": "10.98.1.139",
        "localPort": 59969,
        "appName": "web-browsing",
        "txBytes": 384,
        "rxBytes": 186,
        "txPkts": 6,
        "rxPkts": 3,
        "tcpFlags": "SAECF",
        "durationUsec": 559685,
        "ts": "1591646859244",
        "profileType": "IoT",
        "profileConfidenceLevel": 99,
        "profileId": "CT Scanner CT750HD",
        "profileVertical": "Medical",
        "profileCategory": "CT Scanner",
        "geoLocation": "internal"
      }
    ],
    "iotDevId": "XX:YY:ZZ:01:02:03",
    "@timestamp": "2020-06-08T20:10:31.728Z",
    "routerId": "4C4C4544003838108042B8C04F363133",
    "tenantid": "customerbeta1",
    "timestamp": "1591647028789"
  }
}
```

FIG. 2E

```
Code = Access-Request (1)
ID = x
Length = xx
Request Authenticator
      Attributes:
            Calling-Station-Id = "00:12:67:11:22:33"
            Framed-IP-Address = "10.10.10.1"
            NAS-IP-Address = <zingbox sensor IP>
```

FIG. 4A

```
Code = Access-Request (1)
ID = x
Length = xx
Request Authenticator
    Attributes:
       Calling-Station-Id = "00:12:67:11:22:33"
       Framed-IP-Address = "10.10.10.1"
    Framed-IP-Address = <zingbox sensor IP>
Zingbox-Device-Profiles = "Panasonic Panboard"
Zingbox-Device-Category = "Interactive Whiteboard"
Zingbox-Device-Type = "Office"
Zingbox-Device-Vendor = "Panasonic Corporation"
```

FIG. 4B

```
Code = Access-Request (1)
ID = xx
Length = xx
Request Authenticator
      Attributes:
         Calling-Station-Id = "00:12:67:11:22:33"
         Framed-IP-Address = "10.10.10.1"
         NAS-IP-Address = <zingbox sensor IP>
         Zingbox-Device-Profiles = "Panasonic Panboard"
         Zingbox-Device-Category = "Interactive Whiteboard"
         Zingbox-Device-Type = "Office"
         Zingbox-Device-Vendor = "Panadonic Corporation"
         Zingbox-Device-Model = "KX-B430"
         Zingbox-Device-OS-Group = "Linux"
         Zingbox-Device-OS-Ver = "3.16"
```

FIG. 4C

DISTRIBUTED CARDINALITY OPTIMIZATION

CROSS REFERENCE TO OTHER APPLICATIONS

This application claims priority to U.S. Provisional Patent Application No. 62/868,913 entitled DISTRIBUTED CARDINALITY OPTIMIZATION filed Jun. 29, 2019 which is incorporated herein by reference for all purposes.

BACKGROUND OF THE INVENTION

The amount of data used for analytics to manage network security and operations makes identifying destinations for Information Technology (IT) devices relatively challenging. This becomes dramatically more complex when attempting to sort through Internet of Things (IoT) device destinations and other network data dimensions. Even by conservative estimates, over 20 billion connected devices are expected to be in use by the year 2020. Unfortunately, such growth has been accompanied by concerns of visibility, vulnerability, and service disruptions—the same concerns that traditional IT security solutions have difficulty addressing. Within a single IoT network there can be thousands of IoT devices with millions of destination URLs and billions of IoT network session records that need to be scanned with each query, making managing IoT security and operations an area of ongoing research and development.

BRIEF DESCRIPTION OF THE DRAWINGS

Various embodiments of the invention are disclosed in the following detailed description and the accompanying drawings.

FIG. 2D illustrates an example of a device discovery event.

FIG. 2E illustrates an example of a session event.

FIGS. 4A-4C illustrate examples of RADIUS messages sent by an IoT server to a AAA server on behalf of an IoT device in various embodiments.

DETAILED DESCRIPTION

Figure 1:
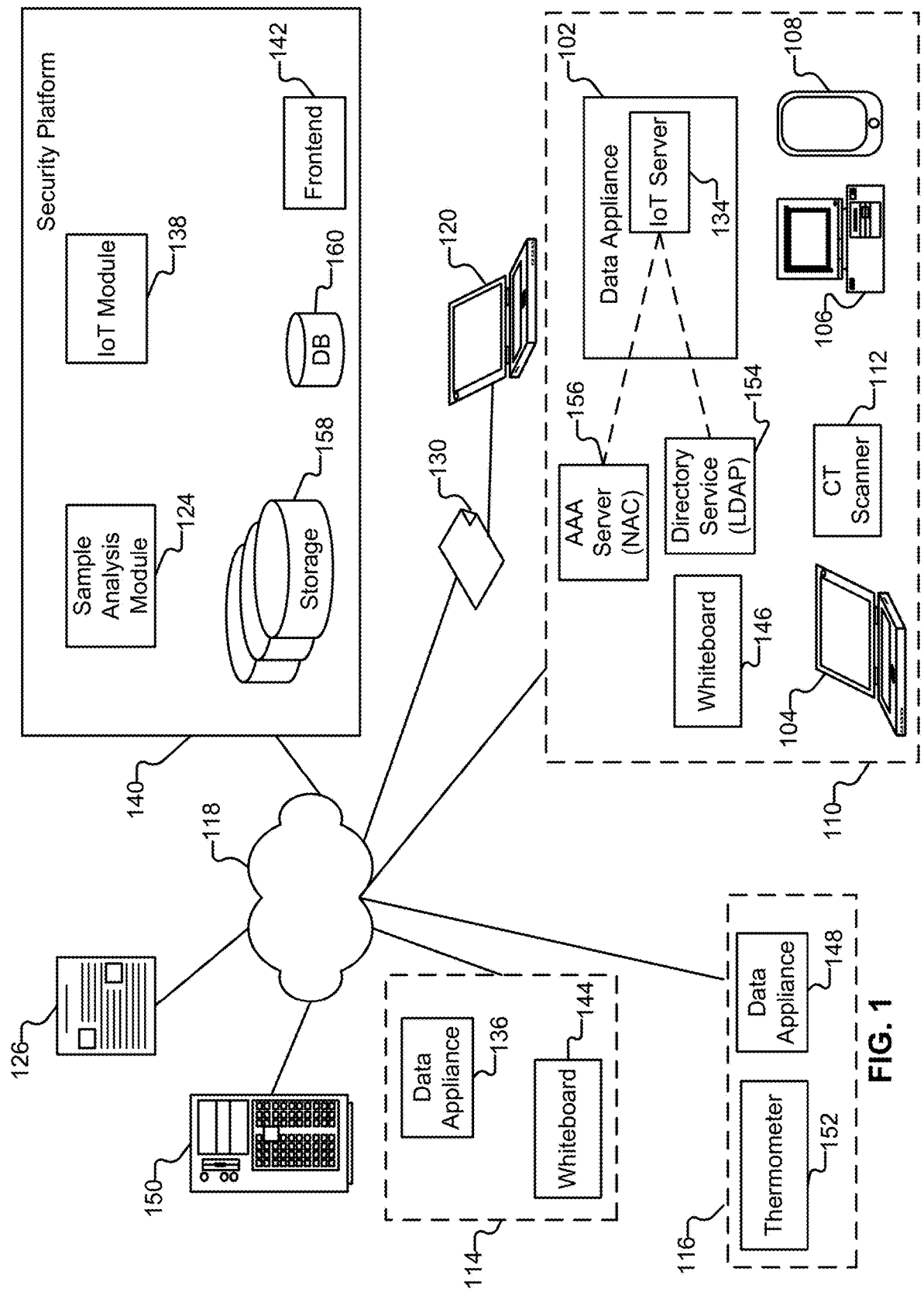
FIG. 1 illustrates an example of an environment in which malicious activity is detected and its harm reduced.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Overview

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provides higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

II. Example Environment

FIG. 1 illustrates an example of an environment in which malicious activity is detected and its harm reduced. In the example shown in FIG. 1, client devices 104-108 are a laptop computer, a desktop computer, and a tablet (respectively) present in an enterprise network 110 of a hospital (also referred to as "Acme Hospital"). Data appliance 102 is configured to enforce policies regarding communications between client devices, such as client devices 104 and 106, and nodes outside of enterprise network 110 (e.g., reachable via external network 118).

Examples of such policies include ones governing traffic shaping, quality of service, and routing of traffic. Other examples of policies include security policies such as ones requiring the scanning for threats in incoming (and/or outgoing) email attachments, web site content, files exchanged through instant messaging programs, and/or other file transfers. In some embodiments, data appliance 102 is also configured to enforce policies with respect to traffic that stays within enterprise network 110.

Network 110 also includes a directory service 154 and an Authentication, Authorization, and Accounting (AAA) server 156. In the example shown in FIG. 1, directory service 154 (also referred to as an identity provider or domain controller) makes use of the Lightweight Directory Access Protocol (LDAP) or other appropriate protocols. Directory service 154 is configured to manage user identity and credential information. One example of directory service 154 is a Microsoft Active Directory server. Other types of systems can also be used instead of an Active Directory server, such as a Kerberos-based systems, and the techniques described herein adapted accordingly. In the example shown in FIG. 1, AAA server 156 is a network admission control (NAC) server. AAA server 156 is configured to authenticate wired, wireless, and VPN users and devices to a network, evaluate and remediate a device for policy compliance before permitting access to the network, differentiate access based on roles, and then audit and report on who is on the network. One example of AAA server 156 is a Cisco Identity Services Engine (ISE) server that makes use of the Remote Authentication Dial-In User Service (RADIUS). Other types of AAA servers can be used in conjunction with the techniques described herein, including ones that use protocols other than RADIUS.

In various embodiments, data appliance 102 is configured to listen to communications (e.g., passively monitor messages) to/from directory service 154 and/or AAA server 156. In various embodiments, data appliance 102 is configured to communicate with (i.e., actively communicate messages with) directory service 154 and/or AAA server 156. In various embodiments, data appliance 102 is configured to communicate with an orchestrator (not pictured) that communicates with (e.g., actively communicates messages with) various network elements such as directory service 154 and/or AAA server 156. Other types of servers can also be included in network 110 and can communicate with data appliance 102 as applicable, and directory service 154 and/or AAA server 156 can also be omitted from network 110 in various embodiments.

While depicted in FIG. 1 as having a single data appliance 102, a given network environment (e.g., network 110) can include multiple embodiments of data appliances, whether operating individually or in concert. Similarly, while the term "network" is generally referred to herein for simplicity in the singular (e.g., as "network 110"), the techniques described herein can be deployed in a variety of network environments of various sizes and topologies, comprising various mixes of networking technologies (e.g., virtual and physical), using various networking protocols (e.g., TCP and UDP) and infrastructure (e.g., switches and routers) across various network layers, as applicable.

Data appliance 102 can be configured to work in cooperation with a remote security platform 140. Security platform 140 can provide a variety of services, including performing static and dynamic analysis on malware samples (e.g., via sample analysis module 124), and providing a list of signatures of known-malicious files, domains, etc., to data appliances, such as data appliance 102 as part of a subscription. As will be described in more detail below, security platform 140 can also provide information (e.g., via IoT module 138) associated with the discovery, classification, management, etc., of IoT devices present within a network such as network 110. In various embodiments, signatures, results of analysis, and/or additional information (e.g., pertaining to samples, applications, domains, etc.) is stored in database 160. In various embodiments, security platform 140 comprises one or more dedicated commercially available hardware servers (e.g., having multi-core processor(s), 32 G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As examples, security platform 140 can perform static/dynamic analysis (e.g., via sample analysis module 124) and/or IoT device functionality (e.g., via IoT module 138) in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140, but may also be provided by a third party. As one example, the virtual machine server can rely on EC2, with the remainder portions of security platform 140 provided by dedicated hardware owned by and under the control of the operator of security platform 140.

Figure 2A:
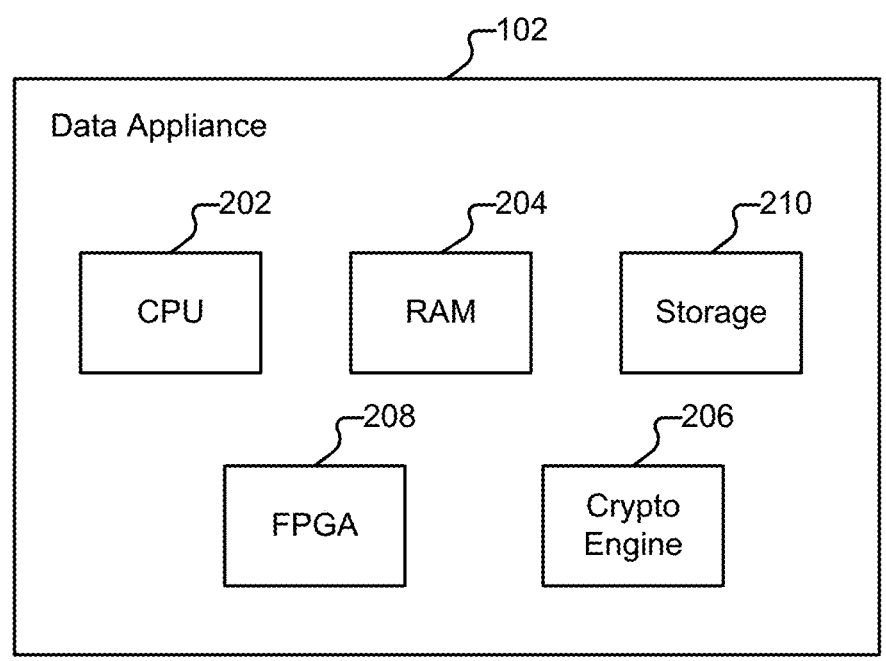
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 110 and implementing disclosed techniques. Examples of such information include application identifiers, content identifiers, user identifiers, requested URLs, IP address mappings, policy and other configuration information, signatures, hostname/URL categorization information, malware profiles, machine learning models, IoT device classification information, etc. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. A given network environment may include multiple data appliances, each of which may be configured to provide services to a particular portion or portions of a network, may cooperate to provide services to a particular portion or portions of a network, etc. The functionality provided by data appliance 102 can also be integrated into or executed as software on a general purpose computer, a computer server, a gateway, and/or a network/routing device. In some embodiments, at least some functionality described as being provided by data appliance 102 is instead (or in addition) provided to a client device (e.g., client device 104 or client device 106) by software executing on the client device. Functionality described herein as being performed by data appliance 102 can also be performed at least partially by or in cooperation with security platform 140, and/or functionality described herein as being performed by security platform 140 can also be performed at least partially by or in cooperation with data appliance 102, as applicable. As one example, various functionality described as being performed by IoT module 138 can be performed by embodiments of IoT server 134.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on. Another example of a component included in data appliance 102 in various embodiments is an IoT server 134, described in more detail below. IoT server 134 can take a variety of forms, including as a standalone server (or set of servers), whether physical or virtualized, and can also be collocated with/incorporated into data appliance 102 as applicable (e.g., as shown in FIG. 1).

Figure 2B:
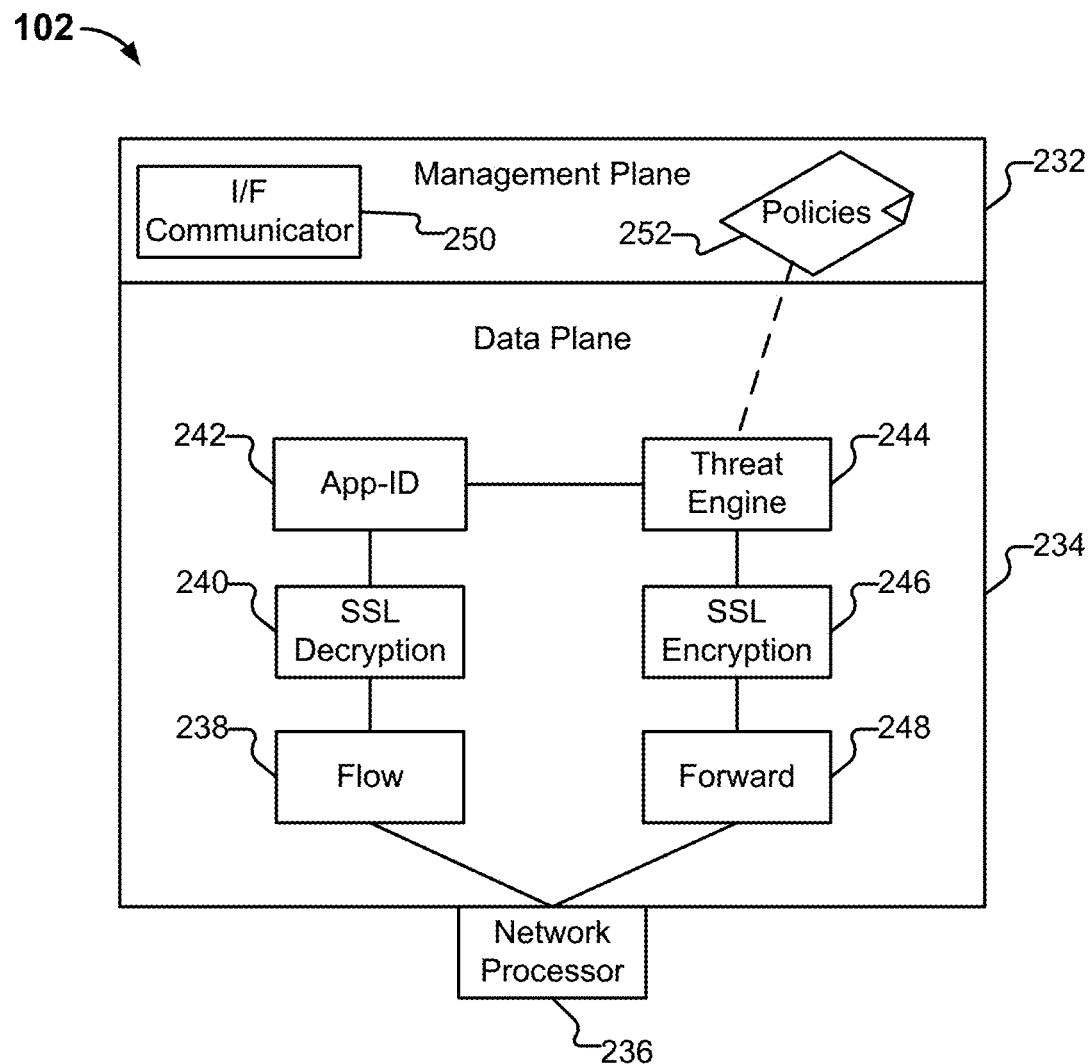
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 110. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, e.g., a web browsing session, the identified application can change, and such changes will be noted by data appliance 102. For example, a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIs, messages, or network protocol communications or other communication mechanisms). Policies 252 can also include policies for managing communications involving IoT devices.

Returning to FIG. 1, suppose that a malicious individual (e.g., using system 120) has created malware 130. The malicious individual hopes that vulnerable client devices will execute a copy of malware 130, compromising the client device, and causing the client device to become a bot in a botnet. The compromised client device can then be instructed to perform tasks (e.g., cryptocurrency mining, participating in denial of service attacks, and propagating to other vulnerable client devices) and to report information or otherwise exfiltrate data to an external entity (e.g., command and control (C&C) server 150), as well as to receive instructions from C&C server 150, as applicable.

Some client devices depicted in FIG. 1 are commodity computing devices typically used within an enterprise organization. For example, client devices 104, 106, and 108 each execute typical operating systems (e.g., macOS, Windows, Linux, Android, etc.). Such commodity computing devices are often provisioned and maintained by administrators (e.g., as company-issued laptops, desktops, and tablets, respectively) and often operated in conjunction with user accounts (e.g., managed by a directory service provider (also referred to as a domain controller) configured with user identity and credential information). As one example, an employee Alice might be issued laptop 104 which she uses to access her ACME-related email and perform various ACME-related tasks. Other types of client devices (referred to herein generally as Internet of Things or IoT devices) are increasingly also present in networks and are often "unmanaged" by the IT department. Some such devices (e.g., teleconferencing devices) may be found across a variety of different types of enterprises (e.g., as IoT whiteboards 144 and 146) and such devices may also be vertical specific. For example, infusion pumps and computerized tomography scanners (e.g., CT scanner 112) are examples of IoT devices that may be found within a healthcare enterprise network (e.g., network 110), and robotic arms are an example of devices that may be found in a manufacturing enterprise network. Further, consumer-based IoT devices (e.g., cameras) may also be present in an enterprise network. As with commodity computing devices, IoT devices present within a network may communicate with resources that are both internal or external to such networks.

As with commodity computing devices, IoT devices are a target of nefarious individuals. Unfortunately, the presence of IoT devices in a network can present several unique security/administrative challenges. IoT devices are often low-power devices or special purpose devices and are often deployed without the knowledge of network administrators. Even where known to such administrators, it may not be possible to install endpoint protection software or agents on IoT devices. IoT devices may be managed by and communicate solely/directly with third party cloud infrastructure (e.g., with industrial thermometer 152 communicating directly with cloud infrastructure 126) using proprietary (or otherwise non-standard) protocols. This can confound attempts to monitor network traffic in and out of such devices to make decisions about when a threat or attack is happening against the device. Further, some IoT devices (e.g., in a healthcare environment) are mission critical (e.g., a network connected surgical system). Unfortunately, compromise of an IoT device (e.g., by malware 130) or the misapplication of security policies against traffic associated with an IoT device can have potentially catastrophic implications. Using techniques described herein, the security of heterogeneous networks that include IoT devices can be improved and the harms posed to such networks can be reduced.

In various embodiments, data appliance 102 includes an IoT server 134. IoT server 134 is configured to identify IoT devices within a network (e.g., network 110). Such identification can be used, e.g., by data appliance 102, to help make and enforce policies regarding traffic associated with IoT devices, and to enhance the functionality of other elements of network 110 (e.g., providing contextual information to AAA 156). In various embodiments, IoT server 134 incorporates one or more network sensors configured to passively sniff/monitor traffic. One example way to provide such network sensor functionality is as a tap interface or switch mirror port. Other approaches to monitoring traffic can also be used (in addition or instead) as applicable.

Figure 2C:
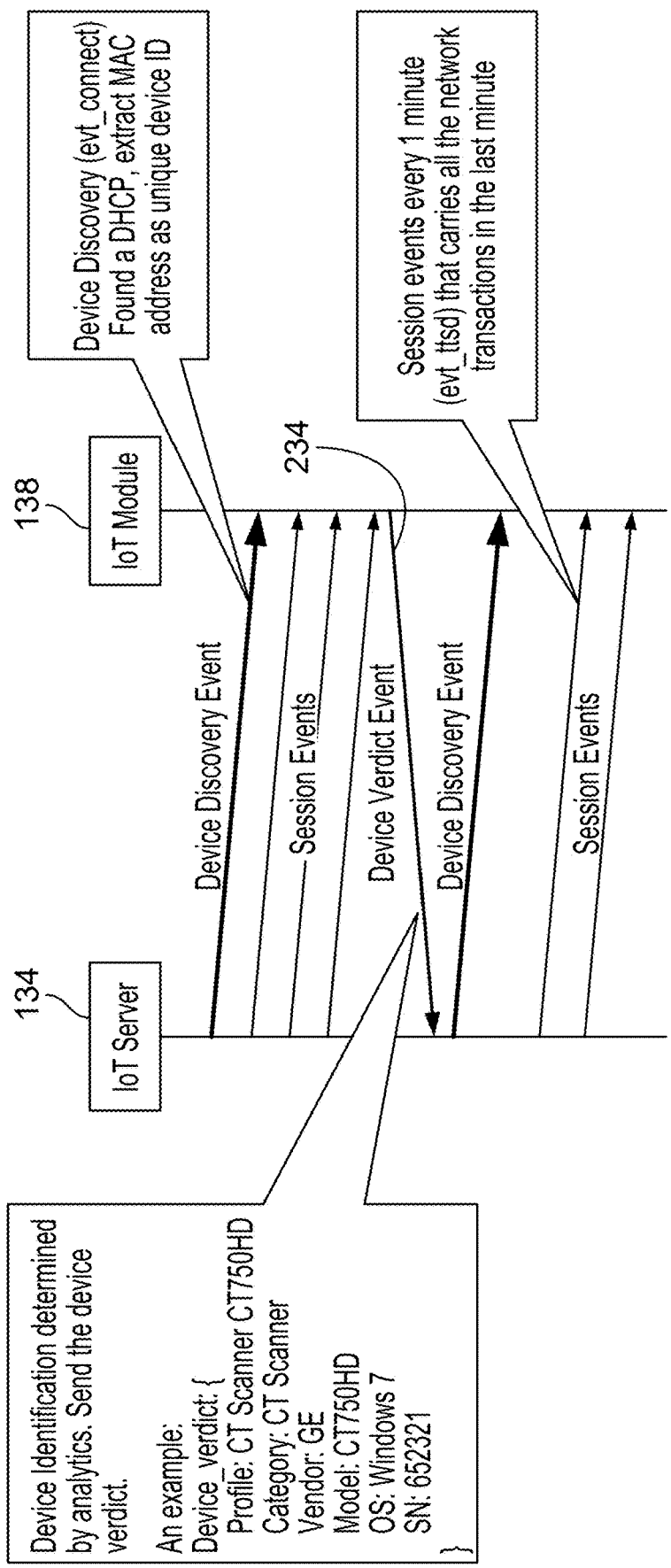
FIG. 2C illustrates an example event path between an IoT server and an IoT module.

In various embodiments, IoT server 134 is configured to provide log or other data (e.g., collected from passively monitoring network 110) to IoT module 138 (e.g., via frontend 142). FIG. 2C illustrates an example event path between an IoT server and an IoT module. IoT server 134 sends device discovery events and session events to IoT module 138. An example discovery event and session event are illustrated in FIGS. 2D and 2E, respectively. In various embodiments, discovery events are sent by IoT server 134 whenever it observes a packet that can uniquely identify or confirm the identity of a device (e.g., whenever a DHCP, UPNP, or SMB packet is observed). IoT module 138 provides IoT server 134 with device classification information via device verdict events (254).

One example way of implementing IoT module 138 is using a microservices-based architecture. IoT module 138 can also be implemented using different programming languages, databases, hardware, and software environments, as applicable, and/or as services that are messaging enabled, bounded by contexts, autonomously developed, independently deployable, decentralized, and built and released with automated processes. One task performed by IoT module 138 is to identify IoT devices in the data provided by IoT server 134 (and provided by other embodiments of data appliances such as data appliances as 136 and 148) and to provide additional contextual information about those devices (e.g., back to the respective data appliances).

Figure 2F:
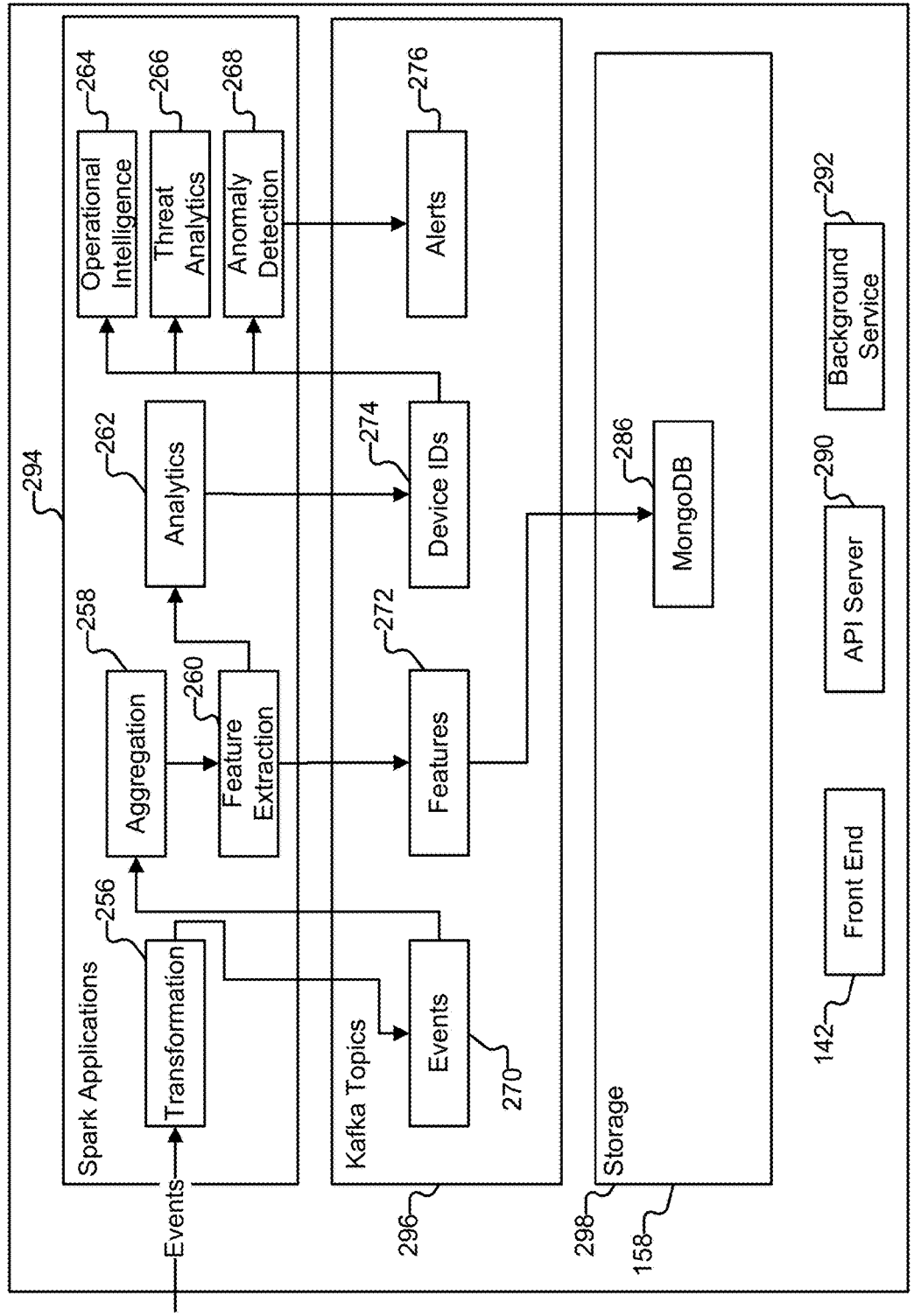
FIG. 2F illustrates an embodiment of an IoT module.

FIG. 2F illustrates an embodiment of an IoT module. Region 294 depicts a set of Spark Applications that run on intervals (e.g., every five minutes, every hour, and every day) across the data of all tenants. Region 296 depicts a Kafka message bus. Session event messages received by IoT module 138 (e.g., from IoT server 134) bundle together multiple events as observed at IoT server 134 (e.g., in order to conserve bandwidth). Transformation module 256 is configured to flatten the received session events into individual events and publish them at 270. The flattened events are aggregated by aggregation module 258 using a variety of different aggregation rules. An example rule is "for the time interval (e.g., 5 minutes), aggregate all event data for a specific device and each (APP-ID) application it used." Another example rule is "for the time interval (e.g., 1 hour), aggregate all event data for a particular device communicating with a particular destination IP address." For each rule, aggregation engine 258 tracks a list of attributes that need to be aggregated (e.g., a list of applications used by a device or a list of destination IP addresses). Feature extraction module 260 extracts features (272) from the attributes. Analytics module 262 uses the extracted features to perform device classification (e.g., using supervised and unsupervised learning), the results of which (274) are used to power other types of analytics (e.g., via operational intelligence module 264, threat analytics module 266, and anomaly detection module 268). Operational intelligence module 264 provides analytics related to the OT framework and operational or business intelligence (e.g., how a device is being used). Alerts (276) can be generated based on results of the analytics. In various embodiments, MongoDB 286 is used to store aggregated data and feature values.

III. Network Entity Id AAA

Suppose, as was previously mentioned, Alice was issued a laptop 104 by ACME. Various components of network 110 will cooperate to authenticate Alice's laptop as she uses it to access various resources. As one example, when Alice connects laptop 104 to a wireless access point located within network 110 (not pictured), the wireless access point may communicate (whether directly or indirectly) with AAA server 156 while provisioning network access. As another example, when Alice uses laptop 104 to access her ACME email, laptop 104 may communicate (whether directly or indirectly) with directory service 154 while fetching her inbox, etc. As a commodity laptop running a commodity operating system, laptop 104 is able to generate appropriate AAA messages (e.g., RADIUS client messages) which will help laptop 104 gain access to the appropriate resources it needs.

As previously mentioned, one problem posed by IoT devices (e.g., device 146) in a network such as 110 is that such devices are often "unmanaged" (e.g., not configured, provisioned, managed by network administrators, etc.), do not support protocols such as RADIUS, and thus cannot be integrated with AAA services such as other devices such as laptop 104. A variety of approaches can be adopted to provide IoT devices with network access within network 110, each of which has drawbacks. One option is for ACME to limit IoT devices to use of a guest network (e.g., via a pre-shared key). Unfortunately, this can limit the utility of the IoT if it is unable to communicate with other nodes within network 110 to which it should legitimately have access. Another option is to allow IoT devices unlimited access to network 110, mitigating the security benefits of having a segmented network. Yet another option is for ACME to manually specify rules that govern how a given IoT device should be able to access resources in network 110. This approach is generally untenable/unworkable for a variety of reasons. As one example, administrators may often not be involved in the deployment of IoT devices and thus will not know that policies for such devices should be included (e.g., in data appliance 102). Even where administrators might, e.g., manually configure policies for specific IoT devices in appliance 102 (e.g., for devices such as device 112), keeping such policies up to date is error prone and is generally untenable given the sheer number of IoT devices that might be present in network 110. Further, such policies will likely be simplistic (e.g., assigning CT scanner 112 by IP address and/or MAC address to a particular network) and not allow for finer grained control over connections/policies involving CT scanner 112 (e.g., dynamically including with policies applicable to surgical devices vs. point of sales terminals). Further, even where CT scanner 112 is manually included in data appliance 102, as previously mentioned, IoT devices will generally not support technologies such as RADIUS, and the benefits in having such AAA servers manage CT scanner 112's networking access will be limited as compared to other types of devices (e.g., laptop 104) which more fully support such technologies. As will be described in more detail below, in various embodiments, data appliance 102 (e.g., via IoT server 134) is configured to provide support for AAA functionality to IoT devices present in network 110 in a passive manner.

In the following discussion, suppose that Alice's department in ACME has recently purchased an interactive whiteboard 146 so that Alice can collaborate with other ACME employees as well as individuals outside of ACME (e.g., Bob, a researcher at Beta University having its own network 114, data appliance 136, and whiteboard 144). As part of the initial setup of whiteboard 146, Alice connects it to a power source and provides it with a wired connection (e.g., to an outlet in the conference room) or wireless credentials (e.g., the credentials for use by visitors of the conference room). When whiteboard 146 provisions a network connection, IoT server 134 (e.g., via a mechanism such as a network sensor as described above) will recognize whiteboard 146 as a new device within network 110. One action taken in response to this detection is to communicate with security platform 140 (e.g., creating a new record for whiteboard 146 in database 160 and retrieving any currently available contextual information associated with whiteboard 146 (e.g., obtaining the manufacturer of whiteboard 146, model of whiteboard 146, etc.)). Any contextual information provided by security platform 140 can be provided to (and stored at) data appliance 102 which can in turn provide it to directory service 154 and/or AAA server 156 as applicable. As applicable, IoT module 138 can provide updated contextual information about whiteboard 146 to data appliance 102 as it becomes available. And, data appliance 102 (e.g., via IoT server 134) can similarly provide security platform 140 with ongoing information about whiteboard 146. Examples of such information include observations about whiteboard 146's behaviors on network 110 (e.g., statistical information about the connections it makes) which can be used by security platform 140 to build behavioral profiles for devices such as whiteboard 146. Similar behavior profiles can be built by security platform 140 for other devices (e.g., whiteboard 144). Such profiles can be used for a variety of purposes, including detecting anomalous behaviors. As one example, data appliance 148 can use information provided by security platform 140 to detect whether thermometer 152 is operating anomalously as compared to historic observations of thermometer 152, and/or as compared to other thermometers (not pictured) of similar model, manufacturer, or more generally, including thermometers present in other networks. If anomalous behavior is detected (e.g., by data appliance 148), appropriate remedial action can be automatically taken, such as restricting thermometer 152's access to other nodes on network 116, generating an alert, etc.

Figure 3:
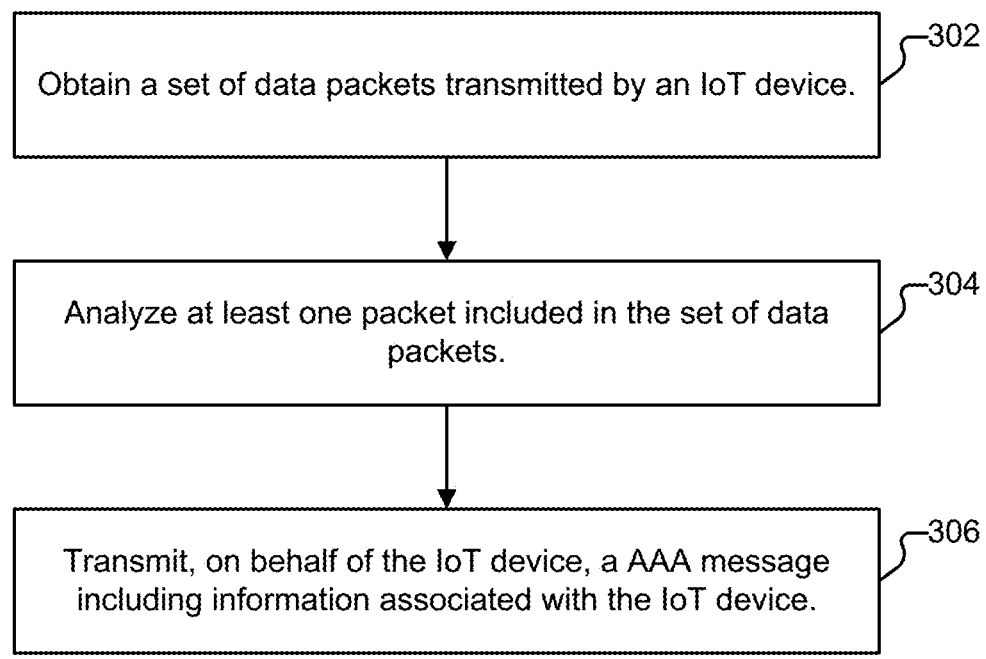
FIG. 3 illustrates an embodiment of a process for passively providing AAA support for an IoT device in a network.

FIG. 3 illustrates an embodiment of a process for passively providing AAA support for an IoT device in a network. In various embodiments, process 300 is performed by IoT server 134. The process begins at 302 when a set of packets transmitted by an IoT device is obtained. As one example, when whiteboard 146 is first provisioned on network 110, such packets can be passively received by IoT server 134 at 302. Packets can also be received at 302 during subsequent use of whiteboard 146 (e.g., as Alice has whiteboarding sessions with Bob via whiteboard 144). At 304, at least one packet included in the set of data packets is analyzed. As one example of the processing performed at 304, IoT server 134 determines that the packets received at 302 are being transmitted by whiteboard 146. One action that IoT server 134 can take is to identify whiteboard 146 as a new IoT device on network 110 and obtain contextual information from IoT module 138 if available. At 306, IoT server 134 transmits, on behalf of the IoT device, a AAA message that includes information associated with the IoT device. An example of such a message is shown in FIG. 4A. As previously mentioned, whiteboard 146 does not support the RADIUS protocol. However, IoT server 134 can generate a message such as is depicted in FIG. 4A (e.g., using information received at 302 and also from security platform 140 as applicable) on behalf of whiteboard 146. As previously mentioned, when IoT server 134 provides information about whiteboard 146 to IoT module 138, IoT module 138 can take a variety of actions such as creating a record for whiteboard 146 in database 160 and populating that record with contextual information about whiteboard 146 (e.g., determining its manufacturer, model number, etc.). As additional contextual information about whiteboard 146 is gathered by security platform 140, its profile can be updated and propagated to data appliance 102. When whiteboard 146 is initially provisioned within network 110, no additional contextual information may be available (e.g., security platform 140 may not have such additional information or providing such information by security platform 140 to IoT server 134 may not be instant). Accordingly, and as is depicted in FIG. 4A, the RADIUS message generated by IoT server 134 on behalf of whiteboard 146 may included limited information. As additional contextual information is received (e.g., by IoT server 134 from IoT module 138), subsequent RADIUS messages sent by IoT server 134 on behalf of whiteboard 146 can be enriched with such additional information. Examples of such subsequent messages are illustrated in FIGS. 4B and 4C. FIG. 4B illustrates an example of a RADIUS message that IoT server 134 can send on behalf of whiteboard 146 once contextual information about whiteboard 146 has been provided by IoT module 138 (e.g., which contains a database of contextual information about a wide variety of IoT devices). In the example shown in FIG. 4B, contextual information such as the manufacturer of the whiteboard (Panasonic) and the nature of the device (e.g., it is an interactive whiteboard) is included. Such contextual information can be used by AAA servers such as AAA server 156 to provide AAA services to whiteboard 146 (without having to modify whiteboard 146), such as by automatically provisioning it on a subnetwork dedicated to teleconferencing equipment. Other types of IoT devices can also be automatically grouped based on attributes such as device type, purpose, etc. (e.g., with critical surgical equipment automatically provisioned on a subnetwork dedicated to such equipment and thus isolated from other devices on the network). Such contextual information can be used to enforce policies such as traffic shaping policies, such as a policy giving preferential treatment to whiteboard 146 packets over social networking packets (e.g., as determined using APP-ID). Fine grain policies could similarly be applied to communications with critical surgical equipment (e.g., preventing any device in communication with such equipment from having an out of date operating system, etc.). In the example shown in FIG. 4C, yet more additional contextual information is included by IoT server 134 in RADIUS messages on behalf of whiteboard 146. Such additional contextual information includes additional attribute information such as the device model, operating system, and operating version. When whiteboard 146 is initially provisioned in network 110, all of the contextual information depicted in FIG. 4C will likely not be available. As whiteboard 146 is used within network 110 over time, additional contextual information can be collected (e.g., as IoT server 134 continues to passively observe packets from whiteboard 146 and provide information to security platform 140). This additional information can be leveraged (e.g., by data appliance 102) to enforce fine grained policies. As one example, as shown in FIG. 4C, whiteboard 146 runs a particular operating system that is Linux-based and has a version of 3.16. Frequently, IoT devices will run versions of operating systems that are not upgradeable/not patchable. Such devices can pose security risks as exploits are developed for those operating systems. Data appliance 102 can implement security policies based on contextual information such as by isolating IoT devices having out of date operating systems from other nodes in network 110 (or otherwise limiting their access) while permitting less restrictive network access to those with current operating systems, etc.

FIGS. 4A-4C depict examples of RADIUS access request messages. As applicable, IoT server 134 can generate a variety of types of RADIUS messages on behalf of whiteboard 146. As one example, RADIUS accounting start messages can be triggered when traffic from whiteboard 146 is first observed. Periodic RADIUS accounting interim update messages can be sent while the whiteboard is in use, and RADIUS accounting stop messages can be sent when whiteboard 146 goes offline.

IV. Distributed Cardinality Optimization

Cardinality in computer science refers to the uniqueness of data values for specific attributes, such as the unique number of destination IPs visited by a device (or an entire organization) in a timeframe. In some cases, it would be desirable to answer cardinality questions in real time. As one example, an administrator may wish to be alerted as soon as any IoT devices in network 110 communicate with remote nodes in foreign countries (e.g., indicative of an attack on network 110). Unfortunately, responding to cardinality queries is resource intensive (e.g., where millions of elements are involved). Nonetheless, using techniques described herein (e.g., flattening and deduplicating session records with a goal to count the value associated with each in-scope key), cardinality can be accomplished in real time.

In computer science, RT computing describes hardware and software systems subject to a real-time constraint. RT programs must guarantee response within specified time constraints, often referred to as deadlines. RT responses are sometimes understood to be in the order of milliseconds or microseconds, but the time constraints associated with responding to queries associated with network session cardinality can be on the order of seconds because that is sufficient for one-track (i.e., without jumping from one task to another while awaiting a response to a query) IoT network security and operations. RT processing fails if not completed within a specified deadline relative to an event. Because asking a human agent of an enterprise to wait for a minute in response to a query would be considered a failure due to lack of efficiency, providing a response to a cardinality query in minutes would be considered a failure to provide a RT response. However, depending upon implementation- or configuration-specific parameters, the deadlines can be configured in accordance with administrator preferences or modified in response to available computing resources.

Near real time (NRT), in telecommunications and computing, refers to the time delay introduced, by automated data processing or network transmission, between the occurrence of an event and the use of the processed data. The distinction between NRT and RT is somewhat nebulous. As used herein, RT requires a seconds (not minutes) delay, which may qualify as NRT in some applications. NRT can be considered to have a delay of minutes, but never hours, which the techniques described herein facilitate where a binary merge might fail to perform in NRT; the techniques described herein allow for at least NRT even for the most massive of session data.

Figure 5:
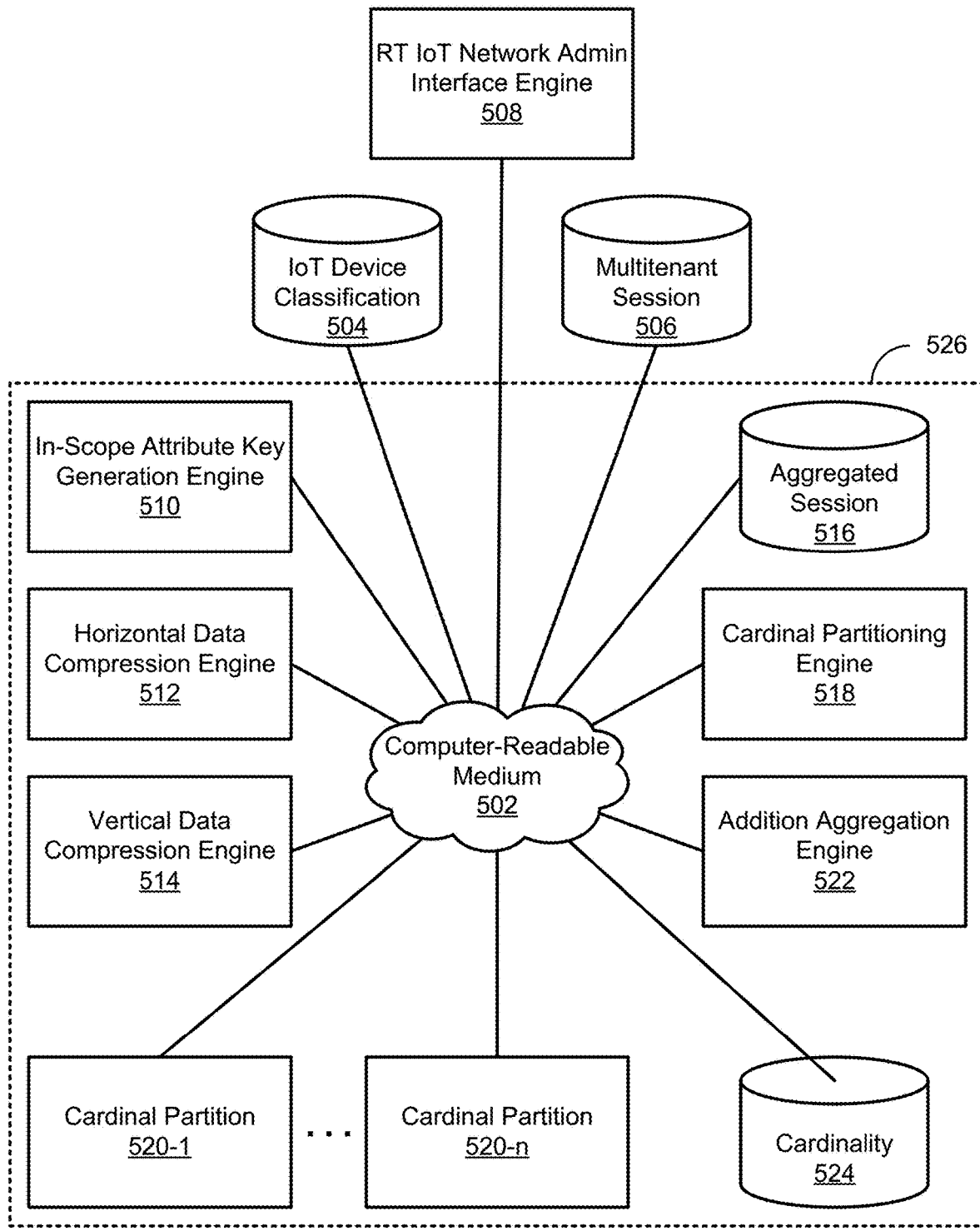
FIG. 5 illustrates an embodiment of an IoT module.

FIG. 5 illustrates an embodiment of an IoT module (e.g., IoT module 138). The IoT device classification datastore 504 is a datastore of IoT device personalities, device categories, profiles, or the like. IoT devices can also be classified on a per-tenant, per-site, time interval, or some other classification identifiable from session (e.g., network session) dimensions or IoT device attributes. Examples of such session dimensions and/or IoT device attributes include destination URL, remote IP, application used, port number, geolocation, or the like. Session dimensions can include binary comparisons, such as whether (or not) a URL is a risky URL, whether (or not) VPN-protected, or the like. As used herein, the session dimensions and IoT device attributes can be referred to collectively as "in-scope attributes" when an in-scope attribute key is generated to match specific ones of the session dimensions and/or IoT device attributes.

Multitenant session datastore 506 is configured to store various session data. Multitenant refers to a software architecture in which a single instance of software runs on a server and serves multiple tenants. Systems designed in such manner are often called shared (in contrast to dedicated or isolated). A tenant is a group of users who share a common access with specific privileges to the software instance. With a multitenant architecture, a software application is designed to provide every tenant a dedicated share of the instance—including its data, configuration, user management, tenant individual functionality, and non-functional properties. Multitenancy contrasts with multi-instance architectures, where separate software instances operate on behalf of different tenants.

MongoDB is an example of a database that is able to deal with small to medium range stream session data; it provides efficient scale-out architecture, and as well, it is an example of a database that can be used as database 506. A single network session can be referred to as a "record" in the session datastore 506. For a single network session, a session record can have tens of dimensions. New records are appended because network sessions are time-streamed. In a typical network, this can result in millions of entries; in a specific implementation, pre-compression, order of magnitude 100 billion records across 256 nodes are processed, or about 400 million records per node. With this amount of data, a RT binary merge operation (or master node operation) is untenable because it could easily take hours to get a result.

In various embodiments, historical session data is retained. For example, raw data can be moved to mass (low cost) storage. If applicable, the multitenant session datastore 506 includes mass storage and engines that implement create, read, update, and delete (CRUD) procedures with respect to the mass storage, as applicable (not shown). Advantageously, because irrelevant data can be moved out of memory, out-of-scope attribute-based compression is achieved.

The RT IoT network admin interface engine 508 is configured to allow a human or artificial agent of an enterprise interested in one or more IoT networks for which the session datastore 506 includes session records to obtain analytics to manage IoT security and operations in RT. In a specific implementation, the analytics are provided in the form of alerts (e.g., 53% of Windows machines are currently talking to Russia, 70% of IoT devices classified as IV pumps are currently offline, or the like) and in response to explicit queries from the agent (e.g., how many Windows machines are currently talking to Russia?, how many IoT devices classified as IV pumps are currently offline?, or the like). Alerts can be generated when session records match a predefined alert pattern from a third party, from a service provider, in accordance with enterprise protocols, or the like. Queries can be across any identifiable session dimension or IoT attribute, unless limited for implementation- or configuration-specific reasons. Queries are made for defined intervals and, advantageously, the vertical data compression engine 514 makes it possible to drop sessions from consideration if they do not have a latest timestamp within the defined interval (as described later). In various embodiments, engine 508 provides an interface (e.g., via a user browser for enterprise customers) to a web server and/or an API server, to a database of the session datastore 506.

Example use cases for queries can include:
1. How many connected IoT devices for a specific tenant during a timespan?
2. How many unique applications involved for a specific tenant during a timespan?
3. Device time series distribution for a specific tenant during a timespan?
4. Unique destinations of IoT devices that visited Russia during a timespan?
5. Top 10 devices with most unique destinations during a timespan?
6. Top 10 devices with most data transferred during a timespan?
7. Unique applications of IV pumps of a hospital during a timespan?

The in-scope attribute key generation engine 510 is configured to generate a key that is used to count sessions that have session dimensions and/or IoT attributes that match the key (i.e., that have in-scope attributes). The parameters of the in-scope attribute key are received from the RT IoT network admin interface engine 508, either in the form of routine or otherwise predetermined analytics information gathering or a RT request from an agent of an applicable enterprise. In a specific implementation, the in-scope attribute key generation engine 510 can handle multiple queries on different attribute keys at the same time. In such an implementation, the horizontal data compression engine 512 can be characterized as a parallel-processing horizontal data compression engine and/or the cardinal partitioning engine 518 can use a composite in-scope attribute key that includes parameters for each query to ensure cardinality across the cardinal partitions 520.

In a specific implementation, in-scope attribute keys include an IoT device parameter array that typically includes {[Tenant]+[Category]+[Profile]}, but can be reduced to a single one of these parameters. Depending upon implementation- or configuration-specific factors, the IoT device parameter array can also include site and/or time interval, but site and time interval are generally treated as session attribute parameters herein. The IoT device parameter array can be referred to as "Parm 0" in examples that follow. For example, an in-scope attribute key has the format "[Parm 0]+[Parm 1]+ . . . +[Parm n]." The parameter set comprising Parm 1 to Parm n can be referred to as the session attribute parameter array; it may or may not be possible for the session attribute parameter array to be the null set. For example, it may be considered advantageous to be able to determine cardinality for an IoT device category or profile, so the in-scope attribute key generation engine 510 is configured to allow the session attribute parameter array to be the null set. On the other hand, if the IoT device parameter array includes only [Tenant], the in-scope attribute key may be too broad to provide meaningful information with an empty session attribute set.

A specific example of a key that may be used in examples of operation in this Specification is "[Tenant]+[Destination]." Thus, the specific example of a key can be referred to as a tenant-matching in-scope attribute key, where the in-scope attribute is destination URL. Alternatives include "[Tenant]+[IoT device category]+[Destination]" and "[Tenant]+[IoT device category]+[IoT device profile]+[Destination]." Such keys can be referred to respectively as tenant-matching, IoT device category-matching, and IoT device profile-matching in-scope attribute keys. It may be noted that in an implementation that only enables tenant-matching IoT device parameters for in-scope attribute keys, the IoT device classification engine 504 may be considered optional. In a specific implementation, [Time Interval] is treated as part of the in-scope attribute key as in: "[Tenant]+[IoT device category]+[IoT device profile]+[Time Interval]+[Destination]." Advantageously, thanks to the vertical data compression techniques described herein, the application of a time interval-matching key is an extremely efficient operation. Specifically, aggregated session records only retain a latest timestamp, which indicates the aggregated session records are all either too old to be counted or are sufficiently recent to be counted. This specific example illustrates a site-matching in-scope attribute key, but alternatives are expected, such as application-matching, geolocation-matching, and/or remote IP-matching in-scope attribute keys, to name a few.

The following is an example of a record in database 506 that can be made where data is partitioned based on a remote IP address:

{"_id": ObjectId("59b42fbfcfacf3623959aeb0"), "malicious": false, "monitored": true, "profileType": "IoT", "profileVertical": "Office", "remoteURL": "clients5.google.com", "sessionInit": "Initiator", "siteid": "0", "tenantid": "tnbdiyfn", "remoteiP": "172.217.13.78", "reputationScore": 88, "countryCode": "US", "region": "unknown", "city": "unknown", "regionindex": 146, "date": ISODate("2020-06-01T00:16:13.067Z"), "organization" "GOOGLE", "expireAt": ISODate("2020-07-02T00:16:13.0.067Z"), "geolocation": "domestic", "urlCat": "Search Engines"} where there are 256 partitions and "regionindex" is the hash value of 172.217.13.78 (i.e., 146).

In responding to cardinality queries, a single query can be dispatched in parallel across all 256 partitions as follows (for an organization having an ID of tnbdiyfn):

SELECT (unique(remoteIP)) FROM session WHERE "regionindex"=0 and "tenantID"="tnbdiyfn"+

SELECT (unique(remoteIP)) FROM session WHERE "regionindex"=1 and "tenantID"="tnbdiyfn"+

. . .

SELECT (unique(remoteIP)) FROM session WHERE "regionindex"=255 and "tenantid"="tnbdiyfn"

The following is another example (which cardinally counts the number of unique malicious remote IPs):

SELECT (unique(remoteIP)) FROM session WHERE "regionindex"=0 and "tenantid"="tnbdiyfn" and malicious=true+

SELECT (unique(remoteIP)) FROM session WHERE "regionindex"=1 and "tenantid"="tnbdiyfn" and malicious=true+

. . .

SELECT (unique(remoteIP)) FROM session WHERE "regionindex"=255 and "tenantid"="tnbdiyfn" and malicious=true In a specific implementation, a shard key determines the distribution of a collection's documents among a cluster's shards. For example, MongoDB partitions data in the collection using ranges of shard key values. If a device ID is used as a shard key, good balanced distributions can be achieved, but there may be fat devices that generated a lot of session events. A chunk that exceeds a specified chunk size or contains a number of documents that exceeds a maximum allowable threshold can be split, but a chunk with a range of a single shard key value cannot be split. A fat device will hit this situation if only device id is used as a shard key. A solution is to combine device id with event time stamp for use as a shard key, which significantly reduces the probability of generating jumbo chunks. Automatically splitting chunks does not work well in some cases, such as when setting up a new cluster with a lot of data nodes, adding significant numbers of data nodes to an existing cluster, adding a new shard collection, and inserting a big amount of data to that collection; it could take a long time for a balancer to re-balance data in these situations. A solution is to pre-split chunk ranges (as opposed to, e.g., auto-splitting chunks that exceed a maximum chunk size) to reduce re-balancing time.

The horizontal data compression engine 512 is configured to reduce the amount of data stored for session records in the session datastore 506 by retaining only in-scope attribute values. Horizontal data compression reduces aggregation instances without losing actionable information. In a specific implementation, the horizontal data compression engine 512 removes session and IoT attribute dimensions other than time (which is removed by the vertical data compression engine 514) and in-scope attributes; the horizontal data compression engine 512 removes all out-of-scope attributes (dimensions). For example, if the in-scope attribute key generation engine 510 generates a "[Tenant]+[Destination]" key, the horizontal data compression engine 512 strips dimensions other than tenant and destination URL from each session record because destination URL cardinality is the value being sought. In a specific implementation, horizontal data compressions are performed over multiple different periods of time, such as per-minute, hourly, daily, weekly, and monthly aggregations.

The following is an illustration of horizontal compression with reference to two examples of raw events for a device (dev001) belonging to a particular tenant (org1) and using HTTPS to access 8.8.8.8 during a particular time interval that includes timestamp 13483460 and 13483562:

TenantID:'org1', 'deviceID': 'dev001', 'appName': 'https', remoteIP:'8.8.8.8', ts:'13483461', url:'www.google.com', tx:234, rx:300

TenantID:'org1', 'deviceID': 'dev001', 'appName': 'https', remoteIP:'8.8.8.8', ts:'13483562', url:'www.google.com', tx:204, rx:301

The session data can be compressed as follows:

TenantID:'org1', 'deviceID': 'dev001', 'appName': 'https', remoteIP:'8.8.8.8', ts:'13483460', url:'www.google.com', tx:538, rx:601 using an aggregation rule such as:

SELECT sum (tx), sum(rx) tenantID, deviceID, remoteIP, appName, time_window

FROM Streaming_Events

GROUP BY remoteIP, deviceID, remoteIP, appName, time_window

Figure 6:
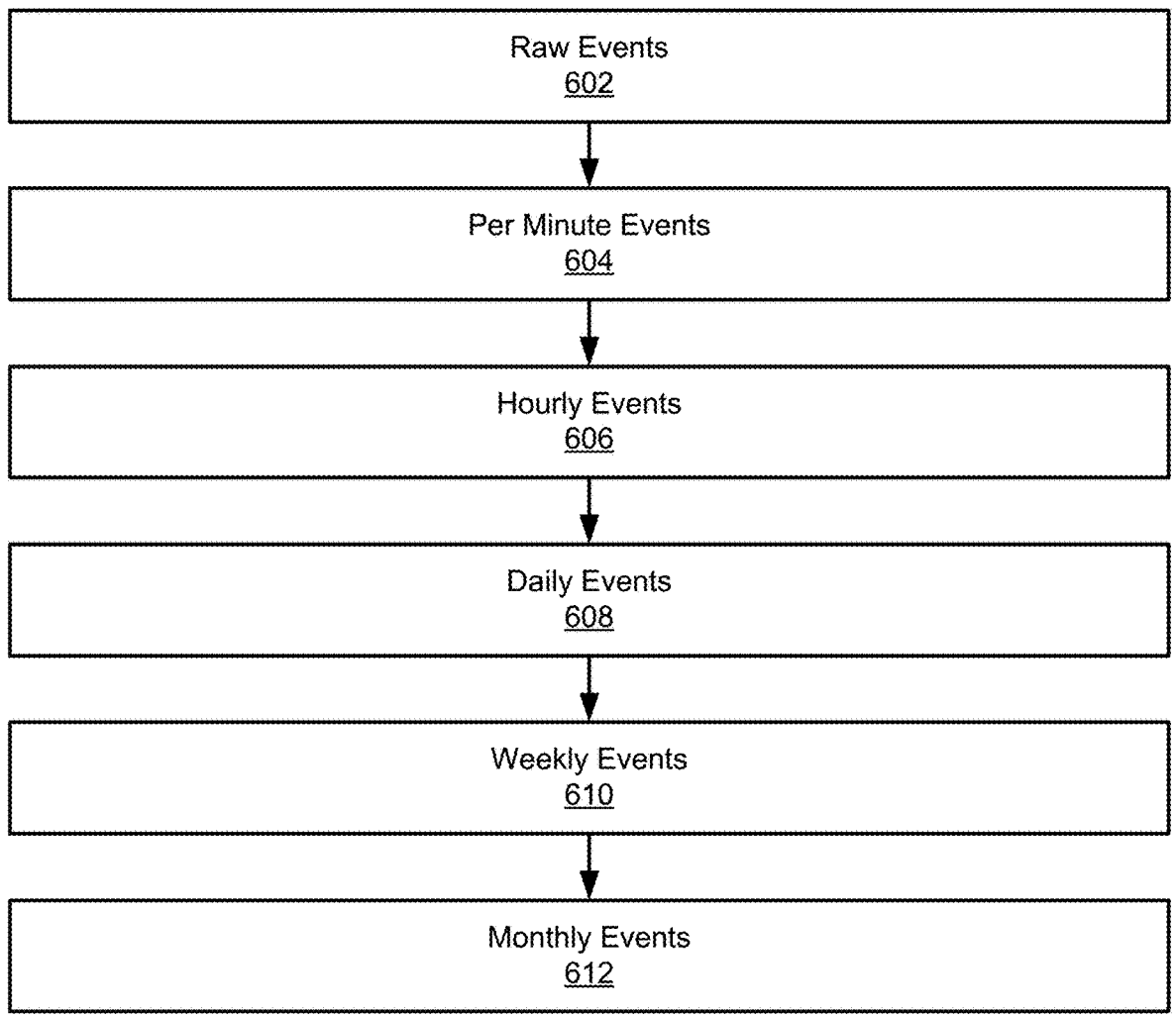
FIG. 6 is a flowchart of horizontal data compression dataflow.

FIG. 6 is a flowchart of horizontal data compression dataflow. The flow of data is from raw events 602 to per minute events 604 to hourly events 606 to daily events 608 to weekly events 610 to monthly events 612. Advantageously, horizontal compression performance impact for aggregate encrypted data in 30 days using horizontal data compression is 40 seconds (per minute), 8000 ms (hourly), 1600 ms (daily), 800 ms (weekly), and 200 ms (monthly). This means horizontal compression could significantly improve, e.g., MongoDB aggregation performance for, e.g., match, group, and sum.

What is determined to be "irrelevant" data will include both out-of-scope data and duplicate data. Due to inherent network issues, an event can be registered late. Device usage is often double-counted because delay could cause usage to show up in a later time window, which is also an issue for out-of-order packets. A solution is to save state (e.g., bitmap) between windows and perform a lightweight state merge using an event report timestamp for the state. When implemented in the horizontal data compression engine 512, the engine can be referred to as a horizontal deduplicated data compression engine.

The vertical data compression engine 514 is configured to reduce the amount of data stored for session records in the multitenant session datastore 506 by retaining only a latest timestamp for in-scope session records. Vertical data compression is a denomination mechanism to achieve high performance for specific (in-scope) aggregations. In a specific implementation, the vertical data compression engine 514 removes time-related dimensions (assuming such time-related dimensions are not in-scope). For example, if the in-scope attribute key generation engine 510 generates a "[Tenant]+[Destination]" key, the vertical data compression engine 514 includes only a latest timestamp for an aggregated session record matching the "[Tenant]+[Destination]" key. Advantageously, because the applicable multitenant session records are all associated with the same timestamp, time series-based compression is achieved. In a specific implementation, the vertical data compression engine 514 supports vertical data compression on a tenant basis; a tenant and device basis; and a tenant, device, and destination basis.

The following is an illustration of vertical compression with reference to three examples of raw events for three devices (dev001, dev002, dev003) belonging to a particular tenant (org1) and using HTTPS to access 8.8.8.8:

TenantID:'org1', 'deviceID':'dev001', 'appName': 'https', ts:'13483460', url:'www.google.com', tx:234, rx:300

TenantID:'org1', 'deviceID':'dev002', 'appName': 'https', ts:'13483460', url:'www.google.com', tx:104, rx:600

TenantID:'org1', 'deviceID':'dev003', 'appName': 'https', ts:'13483460', url:'www.google.com', tx:333, rx:50

Figure 7:
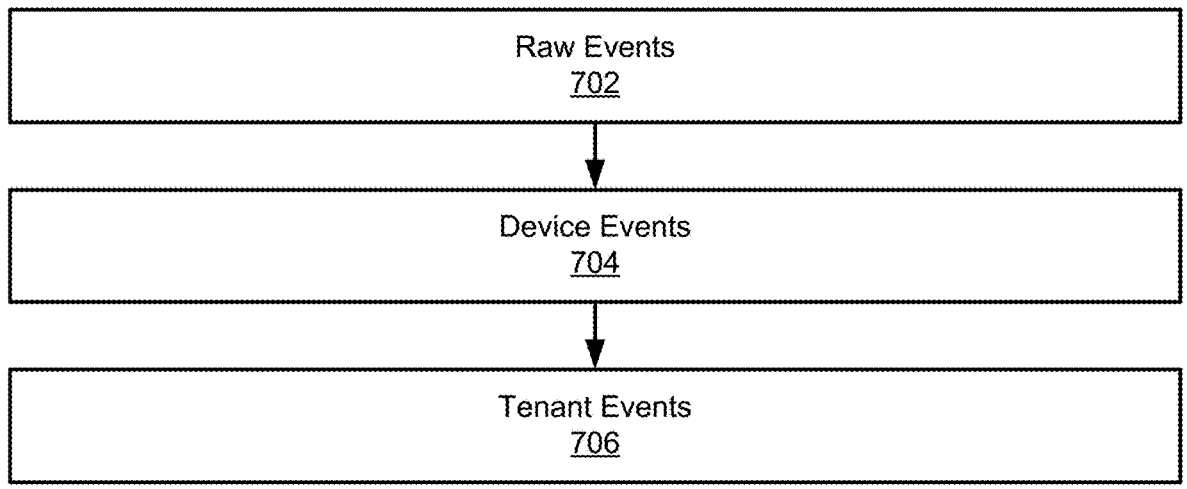
FIG. 7 is a flowchart of vertical data compression dataflow.

The session data can be compressed as follows:

TenantID:'org1', 'appName':'https', remoteIP:'8.8.8.8', ts:'13483460', url:'www.google.com', tx:671, rx:950 using an aggregation rule such as:

SELECT sum (tx), sum(rx), tenantID, remoteIP, time_window
FROM Streaming_Events
GROUP BY remoteIP, remoteIP, time_window FIG. 7 is a flowchart of vertical data compression dataflow. The flow of data is from raw events 702 to device events 704 to tenant events 706. In an example implementation, vertical compression performance impact for aggregate encrypted data in 30 days using vertical data compression for 7,000 devices is 23 minutes (row sessions), 3 minutes (daily agg without horizontal compression), 1600 ms (daily agg with device compression), and 200 ms (daily agg with tenant compression) and using vertical data compression for 80,000 devices is 102 minutes (row sessions), 10 minutes (daily agg without horizontal compression), 3700 ms (daily agg with device compression), and 200 ms (daily agg with tenant compression). This means vertical compression can significantly improve, e.g., MongoDB aggregation performance for, e.g., match, group, and sum.

The aggregated session datastore 516 is a datastore of in-scope key match and latest time stamp records from the horizontal data compression engine 512 and the vertical data compression engine 514, executed in parallel. In an example embodiment, the aggregated session datastore 516 includes a MongoDB that takes advantage of the horizontal and vertical data compressions to improve aggregation performance and reduce resource consumption. For example, an aggregated session record can include "[Tenant]+[Destination]+[latest timestamp]" records. As the data compression engines encounter session records in the multitenant session datastore 506 already represented in the aggregated session datastore 516, redundant records are ignored or the latest timestamp is updated, as applicable. In an example implementation, using this technique, a compression ratio of between 1000 and 10000 is achieved. The latest timestamp is not a dimension, but rather a value that enables elimination of a match for a query associated with a more recent timespan than the latest timestamp, which is useful in practice. A goal when utilizing the aggregated session datastore 516 is, using the much more manageable compressed data, to count the number of matches to the, e.g., "[Tenant]+[destination URL]" key. When keyed to destination URLs in general, the result is an array of unique destination URLs, with the count equal to the magnitude of the array. If keyed to, e.g., geographic area in general, the result would instead be an array of unique geographic areas, with the count equal to the magnitude of the array. Queries can also generate scalars if counting instances of an attribute (e.g., a specific destination URL, such as "www.zingbox.com"), which can be summed in the same manner as an array magnitude, which is also a scalar.

The cardinal partitioning engine 518 is configured to allocate partitions in accordance with the in-scope attribute key of the in-scope attribute key generation engine 510. Divide and conquer is useful for top K and cardinality aggregations, particularly as associated with big data sessions, which is typical in the context herein. A single node processes all session records of the multitenant session datastore 506 that are represented by an aggregated session record of the aggregated session datastore 516. In this way, an aggregated session record can be characterized as uniquely associated with a single cardinal partition (or node). Equivalently, for the "[Tenant]+[destination URL]" key example to provide some illustrative context, the partitions are "cardinal partitions" because a specific destination URL does not cross into multiple partitions.

In an example embodiment, the number of cardinal partitions 520 is variable and is determined by cardinal partitioning engine 518. For example, the cardinal partitioning engine 518 could set 'n' equal to the number of aggregated session records. Because there are frequently more aggregated session records than would be suitable for allocation to unique partitions, in a specific implementation, a hash value for each aggregated session record is computed and a first set of aggregated session records is allocated to the cardinal partition 520-1, . . . , and an nth set of aggregated session records is allocated to the cardinal partition 520-n. In this way, hash values are generated from in-scope attribute keys. Advantageously, the hash value for partitioning ensures queries on the same key always go to a single partition.

When using techniques described in herein, the designated number of partitions has a nominal impact. In general, fewer partitions are easier to manage from an operations perspective, but have a higher recovery cost, are less able to fully utilize compute, and have parallel query issues. Dynamically allocating cardinal partitions on a per-aggregated session basis is possible (and/or designating a per-hash limitation for aggregated session records is possible), whereas a binary merge would grow increasingly time-consuming with more partitions and reduced partitions would make it increasingly difficult to get a uniqueness list, so dynamic allocation would likely be considered undesirable. It may be noted that although the designated number of partitions has a nominal impact, no benefit is generally derived from having more partitions than aggregated session records, so it is assumed the number of partitions is less than or equal to the number of aggregated session records and, where the number of partitions equals the number of aggregated session records, hashing in-scope attribute keys is not necessary.

In an example embodiment, cardinal partitioning engine 518 is reactive. For example, if load balancing does not appear to be a problem, the cardinal partitioning engine 518 can increase the number of cardinal partitions 520 (and, conversely, if load balancing appears to be a problem, the cardinal partitioning engine 518 can decrease the number of cardinal partitions 520). As another example, if it is determined compute is not being utilized as efficiently as desired, as determined by compute efficiency falling below a compute efficiency threshold range, the cardinal partitioning engine 518 can increase the number of cardinal partitions 520 (and, conversely, if compute efficiency exceeds a compute efficiency threshold range, the cardinal partitioning engine 518 can decrease the number of cardinal partitions 520). As another example, if it is determined that operations management complexity is too high, the cardinal partitioning engine 518 can decrease the number of cardinal partitions 520 (and, conversely, if operations management can support some additional complexity, the cardinal partitioning engine 518 can increase the number of cardinal partitions 520). As another example, if it is determined that estimated recovery cost is too high, as determined by the estimated recovery cost exceeding an estimated recovery cost threshold range, the cardinal partitioning engine 518 could increase the number of cardinal partitions 520 (and, conversely, if estimated recovery cost is below an estimated recovery cost threshold range, the cardinal partitioning engine 518 could decrease the number of cardinal partitions 520); the determination could also be based upon actual historical recovery costs. In general, higher recovery costs are due to the amount of data in each node. Lower numbers of partitions also reduce the benefits of a parallel query.

The cardinal partitions 520 represent nodes with associated compute (resources). The cardinal partitions 520 are responsible for processing multitenant session records from the multitenant session datastore 506 for storage in the aggregated session datastore 516 in accordance with in-scope attribute key matching. As such, the data compression engines 512, 514, can be characterized as incorporated into and distributed across the cardinal partitions 520, but are represented distinctly for illustrative purposes. In a specific implementation, using the "[Tenant]+[destination URL]" key example to provide some illustrative context, all events associated with, e.g., the google.com destination URL go to a specific one of the cardinal partitions 520. Advantageously, the data compression engines 512, 514 dramatically reduce the burden on the cardinal partitions 520 relative to uncompressed session data. In addition, the cardinal partitioning engine 518 ensures cardinality, which eliminates the need for any form of binary merge or aggregation of session data at a master node. A cardinality obtained without using a binary merge can be referred to as a non-merged cardinality or cardinality without a partition merge. A cardinality obtained using neither a binary merge nor aggregation at a master node can be referred to as one-step cardinality or cardinality derived from cardinal partitions. It should be understood that in-scope attribute partitioning is applicable for any dimension for which a key can be generated (e.g., application-specific partitioning, geolocation-specific partitioning, etc.).

It may be necessary to allow disk use for the handling of large datasets, which enables aggregation pipeline stages to write data to temporary files, because if a pipeline stage exceeds a RAM limit (for, e.g., MongoDB pipeline stages the limit is 100 MB), an error is produced. This constraint makes aggregation very slow to deal with fat OnLine Analytical Processing (OLAP) operations (e.g., top k and cardinality). In a specific divide and conquer use case, the cardinal partitioning engine 518 creates partitions for events and the cardinal partitions 520 do aggregation for each partition, the results of which are represented by the aggregated session datastore 516. The results from all aggregations can be merged in API servers.

Figure 8:
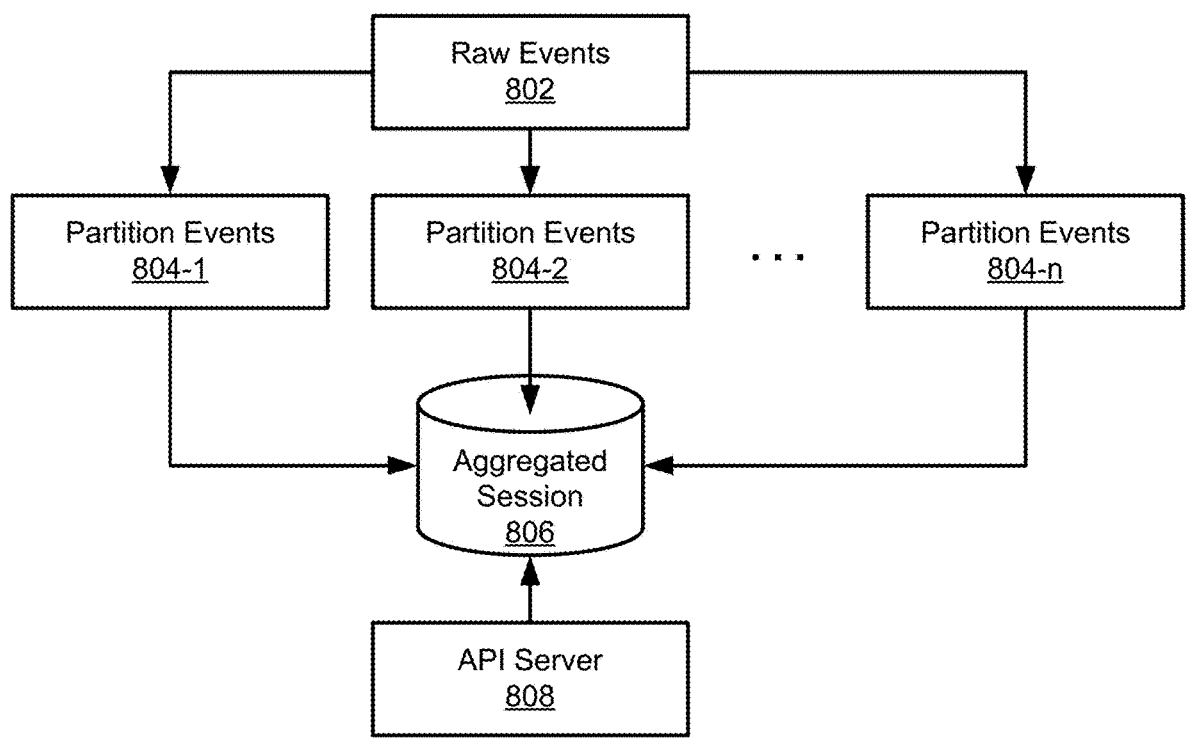
FIG. 8 is a flowchart of an example divide and conquer dataflow.

FIG. 8 is a flowchart of an example of a divide and conquer dataflow. The flow of data is from raw events 802 to partition events 804 (a partition event 804-1 to a partition event 804-*n*), and then to the aggregated session datastore 806. An API server 808 can access the aggregated session datastore 806. In an example implementation in which the aggregated session datastore includes a MongoDB cluster, divide and conquer performance impact for aggregate horizontal unique destinations in 30 days for 203,000 unique destinations is 123 minutes (row sessions), 4 minutes (daily agg without horizontal compression), 18 seconds (daily agg with destination compression), and 1200 ms (divide and conquer); and for 2.7 million unique destinations is 307 minutes (row sessions), 12 minutes (daily agg without horizontal compression), 76 seconds (daily agg with destination compression), and 1800 ms (divide and conquer), which shows that divide and conquer can improve MongoDB aggregation performance for cardinality aggregation. Divide and conquer also improves top k aggregation performance.

The addition aggregation engine 522 is configured to use a light addition aggregation to sum magnitudes of each in-scope attribute array, which are distributed among the cardinal partitions 520. One-step cardinality can be characterized as the sum of magnitudes of each in-scope attribute array. The advantages associated with expensive set merge operations can, using this technique, be replicated with a cardinality summary that can be accomplished in real time.

The cardinality datastore 524 has the numeric result of a query. For example, cardinality could be the number of different destination URLs or the count for a specific destination URL. The RT IoT network admin interface engine 508 (or some other engine) can report the cardinality result in RT relative to when an initial query was provided via the RT IoT network admin interface engine 508 (i.e., in seconds). In an alternative in which an NRT network admin interface engine receives the cardinality query, the NRT network admin interface engine (or some other engine) can report the cardinality result in NRT (i.e., in minutes).

Figure 9:
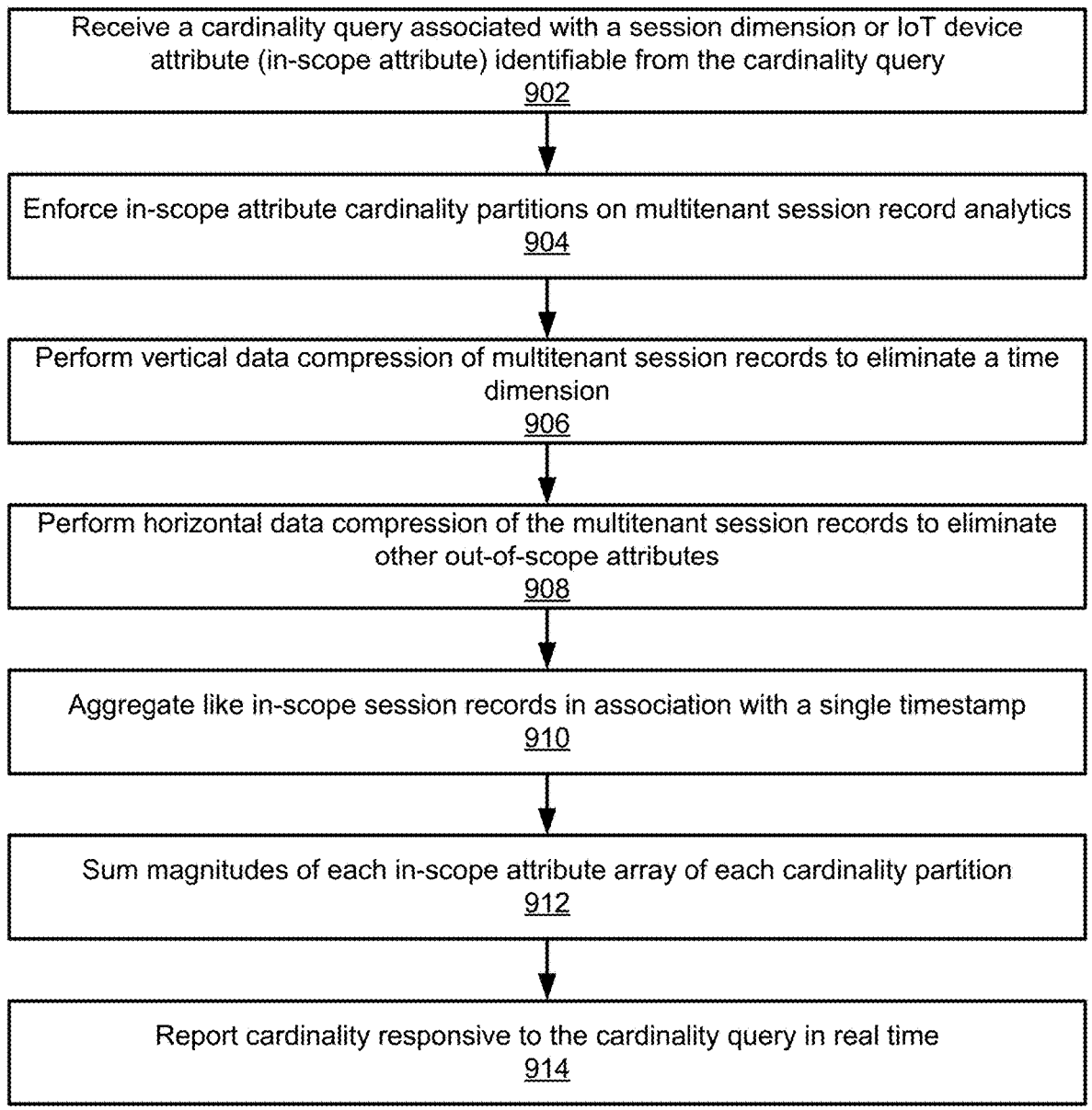
FIG. 9 is a flowchart of an example of a process for obtaining a cardinality report.

FIG. 9 is a flowchart of an example of a process for obtaining a cardinality report. The process begins at 902 with receiving a cardinality query associated with a session dimension or IoT device attribute (in-scope attribute) identifiable from the cardinality query. An RT IoT network admin interface engine, such as the RT IoT network admin interface engine 508 described with reference to FIG. 5 can receive a cardinality query associated with a session dimension or IoT device attribute (in-scope attribute) identifiable from the cardinality query.

The process continues to 904 with enforcing in-scope attribute cardinality partitions on multitenant session record analytics. A cardinality partitioning engine, such as the cardinality partitioning engine 518 described with reference to FIG. 5, can enforce in-scope attribute cardinality partitions on multitenant session record analytics.

The process continues to 906 with performing vertical data compression of multitenant session records to eliminate a time dimension. It is at least in theory possible to retain a time dimension (in which case the relevant time dimension should be treated as an in-scope attribute and vertical data compression would only eliminate out-of-scope time dimensions, if any), but in expected cardinality reporting situations the value of retaining a time dimension is dubious. A vertical data compression engine, such as the vertical data compression engine 514 described with reference to FIG. 5, can perform vertical data compression of multitenant session records to eliminate a time dimension.

The process continues to 908 with performing horizontal data compression of multitenant session records to eliminate other out-of-scope attributes. Here, "other" out-of-scope attributes means attributes other than time dimension attributes removed with the aforementioned vertical data compression. A horizontal data compression engine, such as the horizontal data compression engine 512 described with reference to FIG. 5, can perform horizontal data compression of multitenant session records to eliminate other out-of-scope attributes.

The process continues to 910 with aggregating like in-scope session records in association with a single timestamp. Here, "like" refers to session records that match the in-scope key with the same attribute values. For example, a "destination URL" parameter can be matched to both "www.z- ingbox.com" and "www.google.com," but first session records that have a destination URL of www.zingbox.com would be considered like in-scope session records, but second session records that have a destination URL of www.google.com would not be like the first session records. In this example, the first session records would be associated with a single timestamp, such as the most recent timestamp of all of the first session records. Cardinal partitions, such as the cardinal partitions 520 described with reference to FIG. 5, can perform aggregate like in-scope session records in association with a single timestamp.

The process continues to 912 with summing magnitudes of each in-scope attribute array of each cardinality partition. A count equal to the magnitude of an array of aggregated in-scope session records is available for each cardinal partition and the sum of the counts for each cardinality partition is a cardinality result for the cardinality query. An addition aggregation engine, such as the addition aggregation engine 522 described with reference to FIG. 5, can sum magnitudes of each in-scope attribute array.

Figure 10:
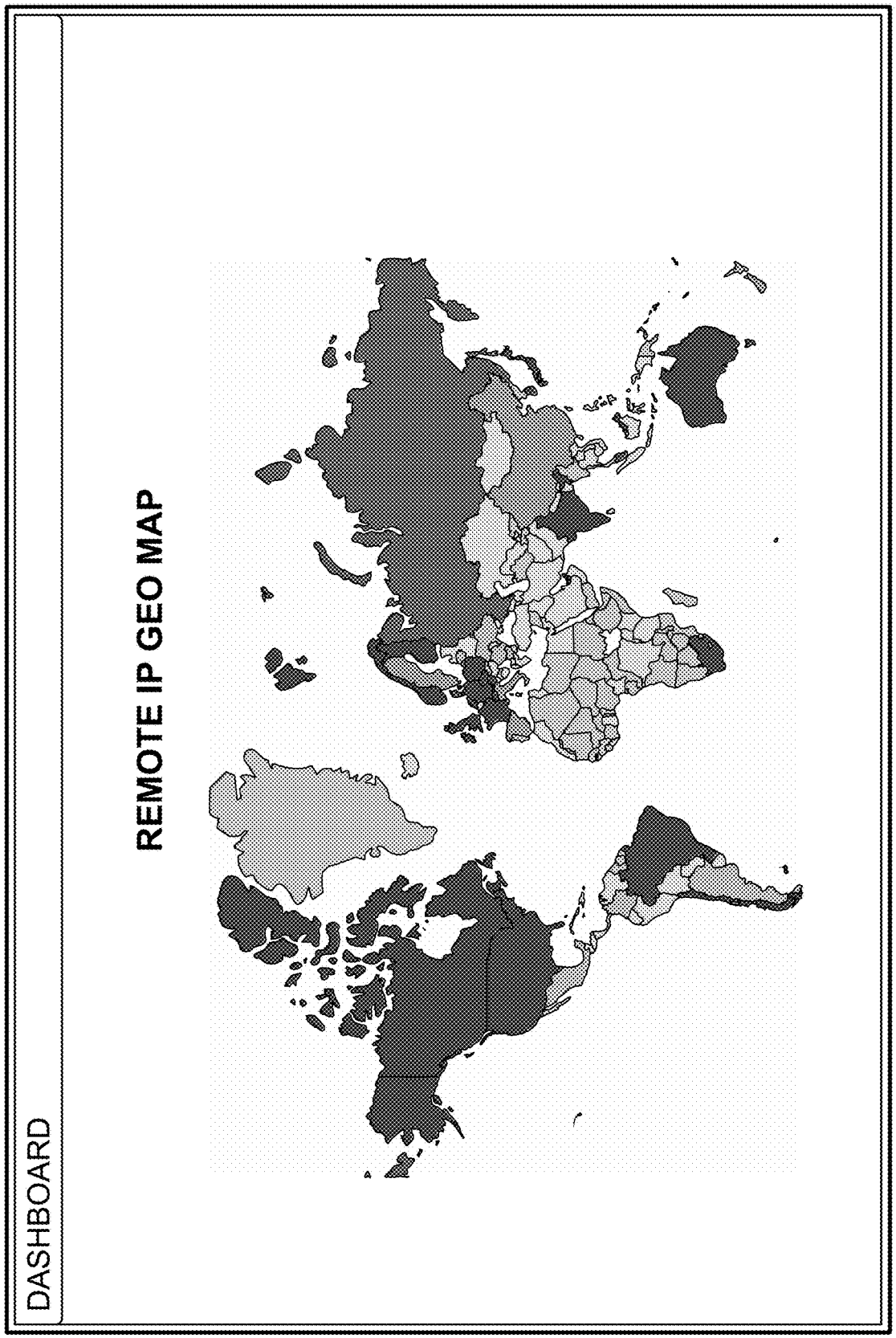
FIG. 10 illustrates an example of an interface.

The process ends at 914 with reporting cardinality responsive to the cardinality query in real time. As used herein, RT is understood to mean in seconds, not minutes, though deadlines can be adjusted to limit the number of seconds for "impatient" admins. An RT IoT network admin interface engine, such as the RT IoT network admin interface engine 508 described with reference to FIG. 5, can report cardinality responsive to the cardinality query in real time. In an alternative using an NRT network admin interface engine, cardinality can be reported in NRT (i.e., in minutes). An example of an interface is shown in FIG. 10. The displayed map depicts the number of unique remote IPs for an organization, where the darker a country is depicted, the more visits to/from a unique remote IP it has received. An example of an aggregation rule that can be used to efficiently store data in database 506 using vertical compression is:

SELECT countryCode, tenantID, COUNT(UNIQ(remoteIP)), time_window
FROM Streaming_Events
GROUP BY countryCode, tenantID, time_window Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a hardware processor configured to:
receive, from a client device, a cardinality query associated with at least one of a session dimension or a device attribute identifiable from the cardinality query requesting a count of unique data values for a specific attribute for a defined time interval;
use the received cardinality query to generate and transmit to a data store a plurality of non-overlapping queries, wherein stored session records in the data store are compressed, at least in part, by a vertical data compression engine removing irrelevant time attributes and a horizontal data compression engine removing one or more irrelevant non-time attributes;
receive a plurality of responses from the data store based on the compressed session records;
aggregate results from the plurality of responses; and
return the aggregated results to the client device; and
a memory coupled to the hardware processor and configured to provide the processor with instructions.

2. The system of claim 1, wherein the specific attribute is destination IP.

3. The system of claim 1, wherein the specific attribute is a country.

4. The system of claim 1, wherein the specific attribute is a maliciousness flag.

5. The system of claim 1, wherein the cardinality query is received from a configured dashboard associated with the client device.

6. The system of claim 1, wherein the cardinality query is received from a configured alert associated with the client device.

7. The system of claim 1, wherein the cardinality query is received from an administrator associated with the client device in real time.

8. A method, comprising:
receiving, from a client device, a cardinality query associated with at least one of a session dimension or a device attribute identifiable from the cardinality query requesting a count of unique data values for a specific attribute for a defined time interval;
using the received cardinality query to generate and transmit to a data store a plurality of non-overlapping queries, wherein stored session records in the data store are compressed, at least in part, by a vertical data compression engine removing irrelevant time attributes and a horizontal data compression engine removing one or more irrelevant non-time attributes;
receiving a plurality of responses from the data store based on the compressed session records;
aggregating results from the plurality of responses; and
returning the aggregated results to the client device.

9. The method of claim 8, wherein the specific attribute is destination IP.

10. The method of claim 8, wherein the specific attribute is a country.

11. The method of claim 8, wherein the specific attribute is a maliciousness flag.

12. The method of claim 8, wherein the cardinality query is received from a configured dashboard associated with the client device.

13. The method of claim 8, wherein the cardinality query is received from a configured alert associated with the client device.

14. The method of claim 8, wherein the cardinality query is received from an administrator associated with the client device in real time.

15. A computer program product embodied in a non-transitory computer readable storage medium and comprising computer instructions for:
receiving, from a client device, a cardinality query associated with at least one of a session dimension or a device attribute identifiable from the cardinality query requesting a count of unique data values for a specific attribute for a defined time interval;
using the received cardinality query to generate and transmit to a data store a plurality of non-overlapping queries, wherein stored session records in the data store are compressed, at least in part, by a vertical data compression engine removing irrelevant time attributes and a horizontal data compression engine removing one or more irrelevant non-time attributes;

receiving a plurality of responses from the data store based on the compressed session records;
aggregating results from the plurality of responses; and
returning the aggregated results to the client device.

\* \* \* \* \*